(12) United States Patent
Elangovan et al.

(10) Patent No.: US 9,553,694 B1
(45) Date of Patent: Jan. 24, 2017

(54) RF JAMMING MITIGATION SYSTEM AND METHOD

(71) Applicant: Ford Global Technologies, LLC, Dearborn, MI (US)

(72) Inventors: Vivekanandh Elangovan, Dearborn, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/013,211

(22) Filed: Feb. 2, 2016

(51) Int. Cl.
H04K 3/00 (2006.01)
H04W 4/02 (2009.01)

(52) U.S. Cl.
CPC ............... *H04K 3/90* (2013.01); *H04W 4/021* (2013.01)

(58) Field of Classification Search
CPC ............. B60R 25/1003; B60R 25/1004; B60R 25/1025; H04K 3/22; H04K 2203/22
USPC .......................................................... 455/1
See application file for complete search history.

(56) References Cited

U.S. PATENT DOCUMENTS

| | | | |
|---|---|---|---|
| 5,420,568 A * | 5/1995 | Iida | B60R 25/1004 180/287 |
| 5,565,870 A | 10/1996 | Fukuhara et al. | |
| 5,805,056 A * | 9/1998 | Mueller | B60R 25/1003 250/231.1 |
| 8,175,573 B2 | 5/2012 | D'Avello et al. | |
| 8,290,527 B2 | 10/2012 | Richardson | |
| 8,320,872 B2 | 11/2012 | Snider | |
| 9,166,730 B2 * | 10/2015 | Van Wiemeersch | H04K 3/22 |
| 2002/0105417 A1 | 8/2002 | Gillis et al. | |
| 2003/0222813 A1 * | 12/2003 | Boulay | B60R 25/00 342/159 |
| 2005/0237152 A1 * | 10/2005 | Nakashima | B60R 25/246 340/5.65 |
| 2007/0068240 A1 | 3/2007 | Watabe | |
| 2007/0096884 A1 * | 5/2007 | Takashima | B60R 25/1004 340/429 |
| 2008/0049828 A1 * | 2/2008 | Inaba | G07C 9/00309 375/238 |
| 2008/0094190 A1 * | 4/2008 | Okada | B60R 25/1004 340/426.24 |
| 2011/0151795 A1 * | 6/2011 | D'Avello | H04K 3/226 455/63.3 |
| 2013/0198737 A1 | 8/2013 | Ricci | |
| 2013/0281140 A1 | 10/2013 | Rubin et al. | |
| 2014/0285319 A1 * | 9/2014 | Khan | G07C 9/00309 340/5.61 |
| 2015/0321640 A1 * | 11/2015 | Hisada | B60R 25/34 340/426.2 |

* cited by examiner

*Primary Examiner* — Simon Nguyen
(74) *Attorney, Agent, or Firm* — Frank A. MacKenzie; Brooks Kushman P.C.

(57) ABSTRACT

A jamming detection system for a vehicle may include an antenna configured to receive a radio frequency (RF) wave defining a series of RF pulse and quiet phase durations. The system may include a processor programmed to lock the vehicle in response to one but not both of the durations exceeding a predetermined threshold. The processor may also be programmed to arm an alarm of the vehicle in response to both of the durations exceeding respective predetermined thresholds.

16 Claims, 4 Drawing Sheets

RF JAMMING MITIGATION SYSTEM AND METHOD

TECHNICAL FIELD

The present disclosure relates to RF (radio frequency) jamming detection and mitigation.

BACKGROUND

Vehicles are equipped with various types of communication devices that perform and facilitate various functions. In particular, RF is commonly employed to communicate between devices. For example, a remote keyless entry (RKE) system, which allows one to remotely lock and unlock automobile doors, employs RF communication. When a button is pushed on the remote key or keyfob, the remote transmits a coded signal to a receiver unit in the vehicle. When a valid RF signal is transmitted to the receiver unit, the remote entry controller locks or unlocks the vehicle doors. There are multiple scenarios for which commands sent by valid transmitters for a vehicle system may not be received by corresponding receivers. Situations of RF jamming could be unintended or intended, but may have the same result regardless of the reason for the jamming.

SUMMARY

A jamming detection system for a vehicle may include an antenna configured to receive a radio frequency (RF) wave defining a series of RF pulses and quiet phase durations. The jamming detection system may also include a processor programmed to lock the vehicle in response to one but not both of the durations exceeding a predetermined threshold. The processor may be further programmed to arm an alarm of the vehicle in response to both of the durations exceeding respective predetermined thresholds. The predetermined thresholds may be respectively proportional to the pulse duration and quiet phase duration. The processor may be further programmed to adjust at least one of the predetermined thresholds in response to a location of the vehicle falling within a predetermined region. Adjusting at least one of the predetermined thresholds may include reducing at least one of the predetermined thresholds in response to the predetermined region having a jamming occurrence level exceeding a threshold value.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
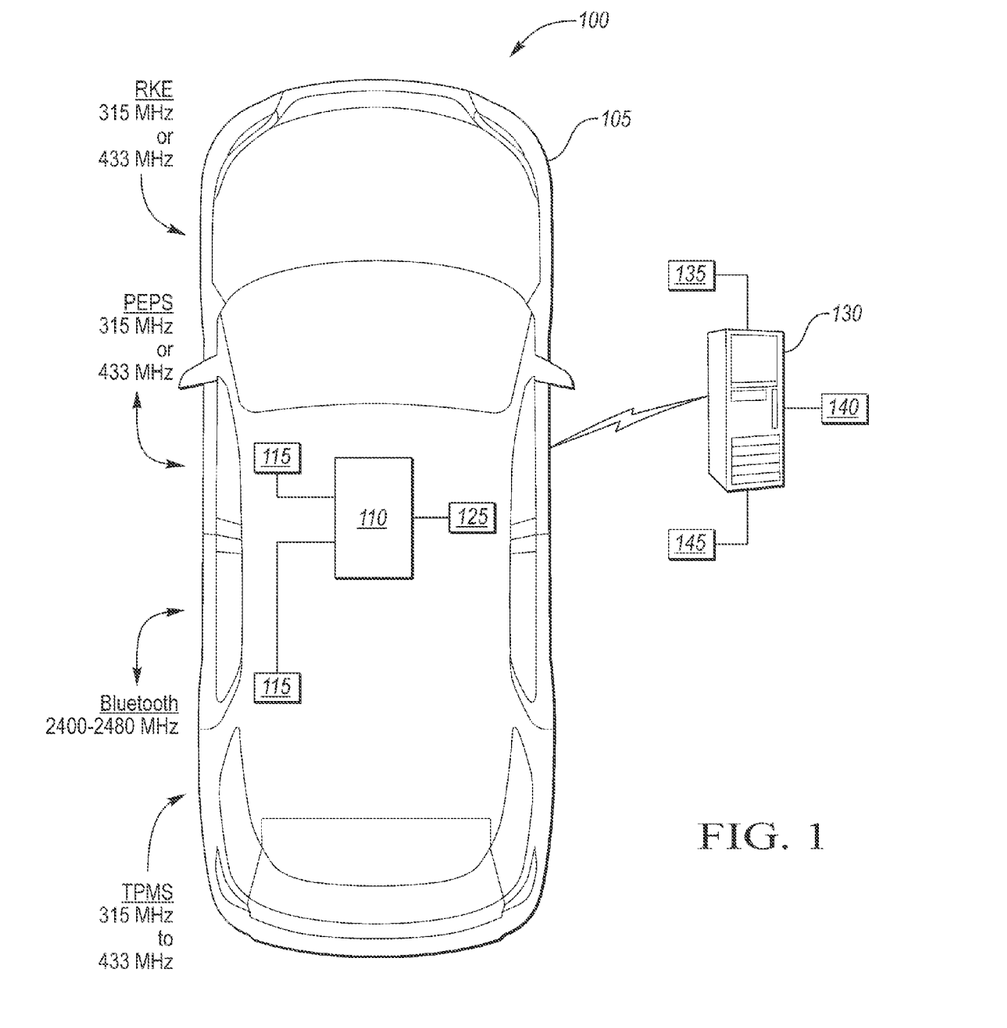
FIG. 1 is an exemplary system of a vehicle for detecting and reporting the occurrence of radio frequency jamming.

FIG. 1 illustrates an exemplary system 100 of a vehicle 105 for detecting and reporting the occurrence of radio frequency (RF) jamming. The vehicle 105 may be any type of vehicle such as a car, truck, bus, airplane, helicopter, or ship, for example. The system 100 may take many different forms and may include multiple and/or alternate components. While an exemplary system 100 is shown in FIG. 1, the exemplary components illustrated in system 100 are not intended to be limiting. Indeed, additional or alternative components and/or implements may be used.

The system 100 may detect occurrences of RF jamming and take measures to prevent a possible theft as well as record, mitigate, and alert of the occurrence. RF jamming may result from intentional blocking of a vehicle's RF communication devices (e.g., a thief using a special transmitter), or may result from unintentional interference from a radio tower or military base. For example, a 105 MHz radio tower may unintentionally emit spurious 315 MHz signals causing vehicle remote entry systems or garage door openers to not respond.

The system 100 may include a processor or controller 110 and at least one antenna, antenna assembly including an antenna, or receiver 115. The controller 110 and the receiver 115 may communicate with each other via an interface (not shown). The interfaces may include an input/output system configured to transmit and receive data from the respective components. The interface may be one-directional such that data may only be transmitted in one direction, i.e., from the controller 110 to the receiver 115, or vice versa. Alternatively, the interface may be bi-directional, allowing both receiving and transmitting data between the components.

The receiver 115 may be part of a system, such as a remote keyless entry (RKE) system or a passive keyless entry/passive start (PEPS) system. These systems are merely exemplary, and the disclosure is not limited in any way to the RKE or PEPS system. As such, one skilled in the art will understand that the disclosure applies to any RF systems on the vehicle. The receiver 115 may be configured to receive a signal from a corresponding counterpart device, such as a key fob or a tire sensor. For example, the controller 110 in a PEPS system may transmit a low frequency (LF) challenge (typically 125 KHz) at a predetermined interval (e.g., 200-

800 ms) in search for an ultra-high frequency (UHF) response from a transmitting key fob on 315 MHz or 434 MHz. The receiver 115 may be located in the vehicle 105, as shown in FIG. 1. Additionally or alternatively, several external receivers 115 may be included in different locations in or on vehicle 105. For example, some systems may have two 315 MHz receivers 115 with one dedicated to PEPS at a higher bit rate (ex., 10-20 kbps) and then one tire sensor or RKE receiver working at a lower bit rate (ex., 2-10 kbps). One receiver may be in a door and another may be on the roof in a "Sharkfin".

The controller 110 may receive input from at least one receiver 115. Upon an identification of the presence of a properly encrypted signal—e.g., with proper protocol format and message duration—sent by a transmitter (such as a key fob or tire pressure sensors, merely as examples), the controller 110 may initiate a challenge-accept sequence with the transmitter. The sequence may include the receiver 115 listening for a response from the transmitter including an identification code associating that transmitter to the subject vehicle. Upon receipt of the correct identification code, the controller 110 may then perform the command, such as lock or unlock of the vehicle 105 doors.

The controller 110 may include any computing device configured to execute computer-readable instructions. For example, the controller 110 may include a processor (not shown) and a database 125. The memory may be comprised of a flash memory, RAM, EPROM, EEPROM, hard disk drive, or any other memory type or combination thereof. Alternatively, the database 125 may be incorporated into the processor. In yet another embodiment, there may be multiple control units in communication with one another, each containing a processor and database 125.

In general, computing systems and/or devices such as the controller 110 may employ any number of computer operating systems, including, but not limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating system distributed by Apple, Inc. of Cupertino, Calif., the Blackberry OS distributed by Research in Motion of Waterloo, Canada, and the Android operating system developed by the Open Handset Alliance. It will be apparent to those skilled in the art from the disclosure that the precise hardware and software of the controller 110 can be any combination sufficient to carry out the functions of the embodiments discussed herein.

Still referring to FIG. 1, the controller 110 may communicate with a remote server 130 via a communication device (not shown), such as a vehicle telematics device or any device that communicates with entities outside the vehicle 105. The communication device may communicate via any wireless communication network such as high bandwidth GPRS/1XRIT channel, RF transmission, a wide area network (WAN) or local area network (LAN), WiFi, Satellite, or a cloud-based communication, for example. In an exemplary implementation, the controller 110 and the remote server 130 may participate in a computing network (e.g., cloud-computing), in which case the remote server 130 may identify the controller 110 by the vehicle identification number (VIN). Additionally or alternatively, the controller 110 and remote server 130 may be in communication over a mobile communication network, such as GSM or CDMA.

The remote server 130 may identify the vehicle 105 by the unique device identifier (UDID) or the international mobile station equipment identifier (IMEI), which may be transmitted via Bluetooth® wireless, for example, to the controller 110. Additionally or alternatively, the communication device (e.g., vehicle telematics device) may include a global positioning system (GPS) or any other system that determines vehicle location.

The remote server 130 may include a computing device 135 or processor, a remote database 140 for storing vehicle 105 information, and a communication device 145 for transmitting and receiving information via the wireless network.

A foreign RF signal—whether intentional or unintentional—may be directed at the vehicle 105 and interfere with the receivers' 115 ability to listen for system commands. The receivers 115 may be configured to receive a signal, the signals of which have signal properties—such as signal strength and duration, protocol format, message structure, and transmitter source ID. During normal operation of a system (e.g., an RKE or PEPS system), the receiver 115 may look for either Amplitude Shift Keyed (ASK) RF activity or Frequency Shift Keyed (FSK) RF activity, as well as frequency modulation (FM) and other RF encoding methods. For example, a receiver 115 for an RKE system may search for a 315 MHz ASK pulse transmitted from a key fob (not shown), with signal strength set at original equipment manufacturer (OEM) design levels. That is, the key fob may radiate bits grouped in message blocks into the air by an RF transmitter that generates a 315 MHz carrier for a specified duration to correspond to a unique message in response to a unique key or key fob button command. As is common with such RKE systems, the transmitter may send 3 to 4 redundant copies of this unique message (e.g., 10-50 ms per message transmission) with dead space between the messages (e.g., 50 ms) resulting in a total transmission time of 400-500 ms for the group of transmissions that result from a single button command. The particular bits in the message block from the key fob contain the command to lock or unlock the vehicle 105, for example. The message block may be received by, for example, a superheterodyne receiver 115, in which case an Envelop Detector circuit converts the 315 MHz carrier amplitude shifting into a digital stream of 1 or 0 bits. As an illustration, the 315 MHz carrier is activated to generate a logic 1 bit and the absence of the carrier is considered a logic 0 bit (e.g., essentially an on or off sequence to convey information).

Figure 2A:
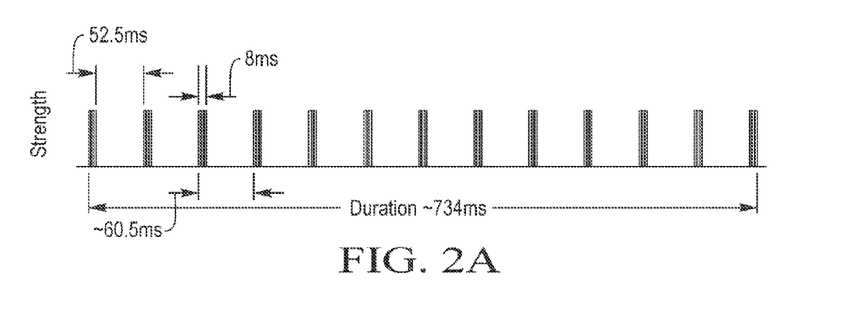
FIG. 2A is an exemplary depiction of a radio frequency signal for a tire pressure monitoring system.
Figure 2B:
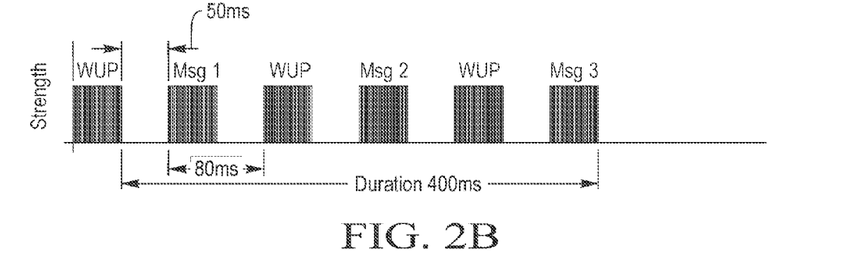
FIG. 2B is an exemplary depiction of a radio frequency signal for a typical remote keyless entry system.
Figure 2C:
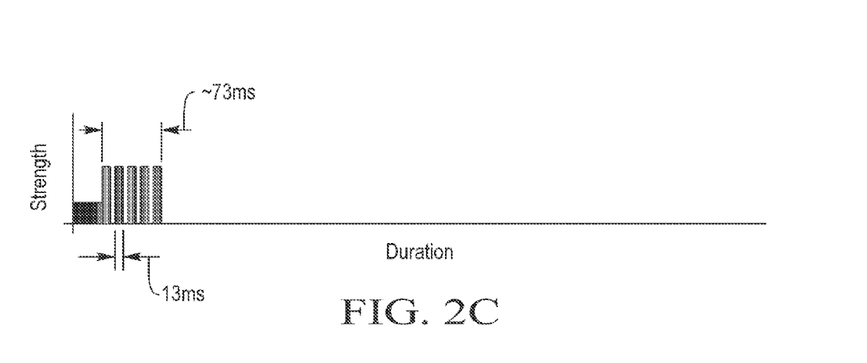
FIG. 2C is an exemplary depiction of a radio frequency signal for a passive entry, passive start system.

FIGS. 2A-2C depict an example of representing a message grouping of typical TPMS, RKE, or PEPS protocols. To allow the various RF systems on the vehicle 105 to co-exist without interference during normal operation, the system transmitters (not shown) located in the key fob or tire pressure sensors, for example, may radiate redundant message pulses. This is particularly important for systems operating or active on the same frequency, such as 315 MHz or 434 MHz for the TPMS, RKE, and PEPS systems. For example, the TPMS illustrated in FIG. 2A may transmit pulses of 52 μs in duration forming 13 redundant messages of about 8 ms in length over a 734 ms duration (with ~52 ms quiet phases) so that if, by chance, the message collides with a key fob RF transmission, several other TPMS pulses may still be heard during the quiet spaces in the key fob messages. Conversely, as illustrated in FIG. 2B, the key fob for an RKE protocol may transmit pulses of 238 μs in duration, forming three redundant messages of about 50 ms in length (and 3 wake-up messages that include no information) to mitigate collisions with other key fobs (e.g., key fobs of other vehicles) or TPMS messages. Additionally, as shown in FIG. 2C, the PEPS system may be active on 315 MHz with pulses of 104 μs in duration forming a single message of about 13 ms in length over a ~73 ms duration.

Figure 2D:
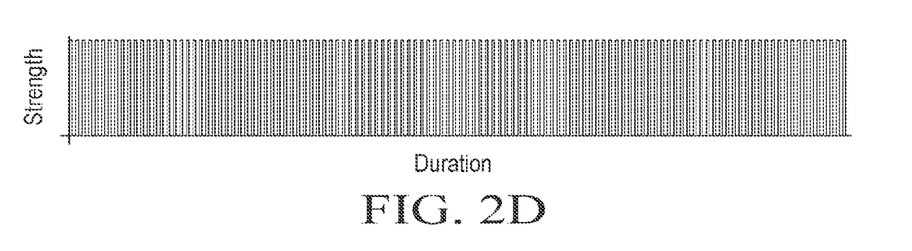
FIG. 2D is an exemplary depiction of a continuous radio frequency jamming signal.
Figure 2E:
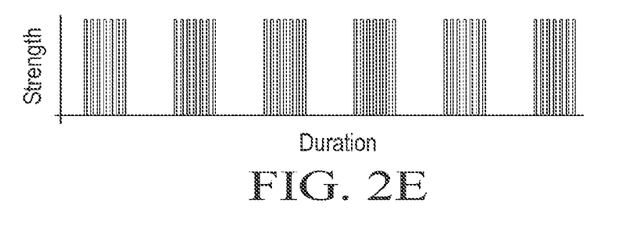
FIG. 2E is an exemplary depiction of a radio frequency jamming signal of proper protocol and message structure, but invalid identification.
Figure 2F:
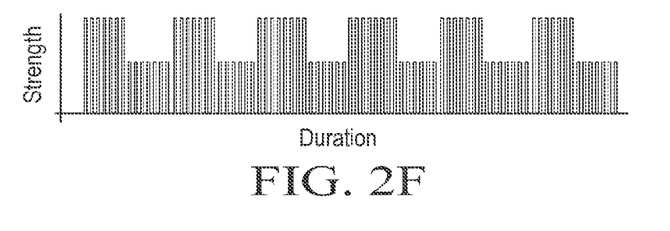
FIG. 2F is an exemplary depiction of a radio frequency jamming signal of proper protocol and message structure, but invalid identification with no quiet phases.

Referring now to FIGS. 2D, 2E, and 2F, problems with RF jamming may occur when a special transmitter (e.g., an invalid or foreign transmitter) having signals with a different pulse duration or quiet phase duration is placed in a location that interferes with a valid transmitter as heard from the target receiver. That is to say, the special transmitter emits RF signals sufficient to disrupt the intended system command.

As shown in FIG. 2D, an RF jamming signal may include continuous ASK pulses on the same frequency exceeding thresholds of OEM design levels. For example, the typical RKE key fob may transmit three ASK pulses, as shown in FIG. 2B, on 315 MHz or 434 MHz to a receiver 115 on the vehicle 105 with 50 ms intervals of quiet phases. However, a continuous ASK pulse train of many pulse durations or pulse widths (e.g., differing from 8 ms for TPMS or 50 ms for RKE) may sufficiently jam the receiver 115 as to make the system non-responsive. For instance, a received signal having a pulse width or quite phase duration other than that set at design level, e.g., as determined by the OEM, may sufficiently interfere with the target receiver 115. Likewise, a received pulse width greater than the design level, e.g., greater than 50 ms for an RKE system. Additionally, an unauthorized identical pulse train with the same bit lengths and encoding but out of phase with the authorized transmitter can result in destructive interference. In other words, the jamming signal may block the key fob command and prevent the vehicle 105 doors from locking or unlocking.

To combat RF jamming in FIG. 2D, the controller 110 may be configured with a predetermined threshold associated with an anticipated pulse width or quiet phase. For instance, a deviation in pulse width of more than a set point, such as 500 μs, may indicate a potential jamming event. As another example, a signal having a pulse width deviation of more than 5% of the anticipated set point levels may exceed a predetermined threshold and indicate a jamming event. A controller 110 may be configured such that a signal not within a band relative to the anticipated RKE, PEPS, and TMPS signals may indicate a jamming event. For instance, a signal having a pulse width of 53 ms may indicate a jamming event because it exceeds a 2 ms predetermined threshold. A signal having a quiet phase of 60 ms may indicate a jamming event. Although there may be overlap between different types of signals, a jamming event may still be indicated in a circumstance as depicted by FIG. 2D because the quiet phase period is not within the proper length (FIG. 2D does not have a quiet phase). This jamming event may engage a controller to operate a vehicle in a particular security mode or have particular security settings.

The signal may include intervals of quiet and active phases. The predetermined threshold may include a pulse or quiet phase duration set at a design level, e.g., as determined by the OEM. Additionally or alternatively, the predetermined threshold may include a sequence of received RF signals. For example, the predetermined threshold may be continuous ASK pulses, as shown in FIG. 2D. The predetermined threshold may associate with a particular RF system. For example, the predetermined threshold for signal strength and duration of an RKE system may be different than that of a PEPS system, although both use a carrier on the same frequency. The controller 110 may then compare the received signal properties and the predetermined threshold to determine a jamming event probability. That is, the controller 110 may determine the probability a jamming signal is currently directed at the vehicle 105. For example, if the receiver 115 receives a pulse width and quiet phase different than the predetermined threshold (e.g., set at the standard OEM level), the controller 110 may determine the jamming event probability is high.

On the other hand, if only one signal property is deviated from the threshold, the jamming event probability may be considered moderate. For example, if the received signal pulse width is sufficient to be considered valid RF activity from other vehicle fobs but it is within the threshold for the quiet phase duration, the controller 110 may determine there is a moderate probability of RF jamming. A signal of valid pulse width but invalid quiet phase may indicate a jamming event. For instance, a jamming signal having a quiet phase of ~60-70 ms may indicate a jamming event if the RSSI gain is sufficiently strong insomuch as a key fob in the PEPS system will only respond with a UHF response in the event it hears/receives the LF challenge and is within range (e.g., 2-4 meters). Furthermore, a jamming event probability may be classified as low if a received signal having a pulse width and quiet phase duration within the acceptable band but not as expected. For instance, a jamming event may be classified as low if the received signal pulse width is not exactly 50 ms, as anticipated, but is within the predetermined threshold relative to the anticipated pulse width.

Figure 3:
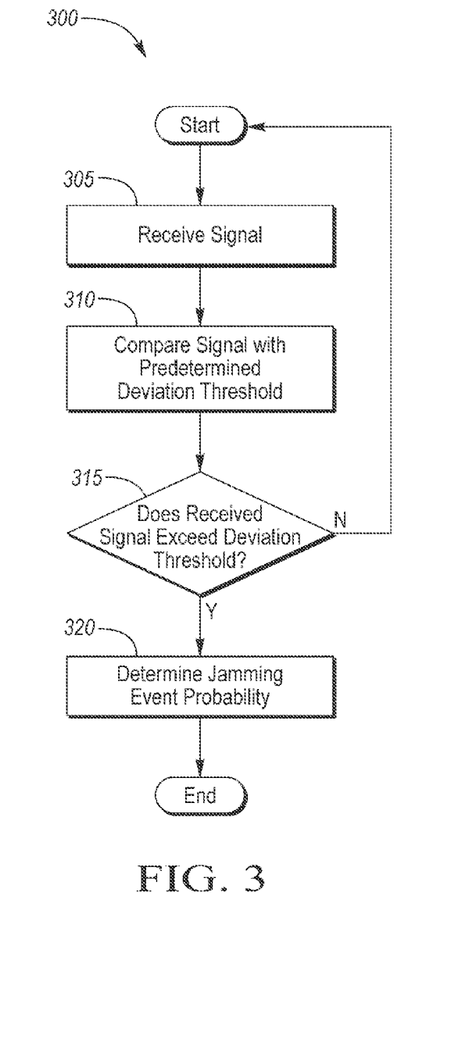
FIG. 3 is an exemplary process for determining a jamming event probability.

FIG. 3 discloses a sophisticated technique of recognition of the RF jamming event. A controller 110 may be configured to recognize patterns of signals in the vicinity (e.g., RKE, TPMS, PEPS, etc.). The patterns may be stored and logged by the database 125. The storage of these patterns may be a listing of the received signals categorically (e.g., RKE, TPMS, PEPS, etc.) with an indication of the received strength and duration of each signal (400 ms, 734 ms, etc.). The database 125 may also include pulse width, quiet phase duration, duty cycle, or cycle time. The stored information may also include location, vehicle states, or other vehicle parameters. The stored information may include preceding or subsequent actions performed by a user. For example, a vehicle traveling to a parking location may be routinely locked after stopping. The controller 110 may be programmed to recognize a parking sequence and search for deviations in a pattern associated with the signals received.

In the event RF jamming signals are detected, the vehicle system may record the event in database 125 along with a timestamp and situational data, e.g., jamming event probability level data, to be used for tracking, record keeping, and correlated purposes. Jamming event probability level data may include the date, time, and location the jamming event was detected, the strength or RSSI value detected from the receiver, the jamming event probability (e.g., high, moderate, or low probability), and the vehicle heading or route. Accordingly, it may be easier to detect and diagnose an RF transmission as a high or moderate jamming event probability with data compiled at a GPS location.

The jamming event probability level data may be transmitted to the remote server 130 and maintained in the remote database 140. The remote database 140 may store the jamming probability event data and associate it with the vehicle identification number (VIN) and location of transmission. The remote server 130 may create a composite database indicating regional hot spots, or regions, after multiple jamming probability events have been detected at the location. Localizing regional hot spots may aid in determining the RF jamming event probability by recognizing areas, days, or times of day that exhibit higher occurrence rates of jamming events. For example, the jamming event probability may be higher in an area with multiple reports of RF jamming signals. The remote server 130 may recognize the jamming event probability level data was transmitted from a hot spot and send an alert to the vehicle or driver. For instance, the remote server 130 may trigger the horn to beep, the headlights to flash, or the alarm to sound. Moreover, a vehicle owner or operator may be notified via a mobile communication device such as a phone, handheld computing device, smartphone, or the like.

The controller 110 may be programmed to operate the vehicle in a first security mode. The first security mode may lock doors, initiate alarms, send signals to the driver, or arm the car alarm. The first security mode may have heightened importance in relation to the second security mode. The second security mode may do similar actions as the first security move to a lesser extent. For instance, the second security mode may beep the vehicle horn and arm the car alarm instead of sounding the car alarm and locking the doors. These combinations are interchangeable and discretionary depending on the manufacture preference and user preference. A user may be empowered to configure mode settings from a graphical user interface. The mode settings may be configured automatically due to location information received by the controller from a GPS system as well.

The security modes may be set in response to a duty cycle or cycle time exceeding a predetermined threshold. For instance, as shown in FIG. 2A, the duty cycle or relationship between active phases and inactive phases may be 13%. The cycle time may be 60.5 ms, as indicated in FIG. 2A. A processor 110 may be programmed to recognize deviations in the duty cycles and cycle times to operate the vehicle in one of the aforementioned security modes. For instance, a received signal may have a duty cycle of 16% and a cycle time of 50 ms, leaving an active phase of 8 ms and an inactive phase of 42 ms. The processor may be programmed to recognize that the vehicle should be operated in the first security mode when there is a 3% deviation in the duty cycle, the predetermined threshold being 2% change in duty cycle, and a change in cycle time of more than 10 ms. The vehicle may be operated a second security mode if the processor is programmed to with similar predetermined thresholds and either the duty cycle or cycle time exceeds the respective predetermined thresholds.

One of the security modes may be a locking mode where the vehicle is set to lock all ingress and egress points of the vehicle. The steering column or electronics systems may also be locked. One of the security modes may also be an alarm arming mode. The alarm arming mode may arm the alarm systems of the vehicle to detect intruders. For instance, the OBDII port may be armed to recognize access, or the entry sensors may be activated to recognize attempts to access the vehicle cabin. The predetermined thresholds may be established relative to anticipated signals the antenna or receiver receives. For instance, as shown in FIG. 2A, a duty cycle near 13% is, anticipated whereas in FIG. 2B a 50% duty cycle is expected. The processor or controller 110 may be programmed with multiple acceptable duty cycle ranges (e.g., 10-15% and 45-55%). Any received signals exceeding these predetermined thresholds may place the vehicle in one of the security modes.

The predetermined thresholds may be adjusted based on the location of the vehicle falling within a predetermined region. A predetermined region may indicate a high population density, crime rate, or jamming occurrence. The predetermined thresholds may be reduced under such circumstances. As in the previous example, the duty cycle having a range of 10-15% may be constricted to 12-14%.

FIG. 3 represents an exemplary process 300 for determining a jamming event probability. The process begins at block 305. At block 305, the receiver 115 receives a signal having signal properties. The signal properties may include signal strength and duration, signal repetition, protocol format, and message structure, for example.

At block 310, the receiver 115 communicates the received signal to the controller 110 in which the controller 110 compares the signal properties with predetermined thresholds. The predetermined threshold may associate with each signal property and may depend on which receiver 115 is responding to the transmission. For example, with respect to 315 MHz UHF RF transmission protocols, the TPMS predetermined threshold for signal pulse width and quiet phase duration may be a level reasonably expected by the OEM design (e.g., a threshold duration of 734 ms). The predetermined duration threshold may be classified by signal format and structure. For example, a received signal of continuous ASK pulses may be a predetermined threshold. Likewise, a received signal with an invalid identification, but proper protocol format and message duration, may be a predetermined threshold. The controller 110 uses the received signal properties, such as signal strength (RSSI) and duration, and compares the received signal with the predetermined threshold.

At block 315, the controller 110 may determine if the signal properties exceed the predetermined threshold. If the signal properties appear normal or fall below the predetermined threshold, the controller 110 runs its normal operations and the process reverts back to block 305. On the other hand, if at least one of the signal properties exceeds the predetermined threshold, the process proceeds to block 320.

At block 320, the controller 110 determines the jamming event probability, which is based at least in part on comparing the pulse width and quiet phase duration or duty cycle and cycle time with the predetermined thresholds associated with each signal property. For example, a received signal having a pulse width and quiet phase duration outside of the predetermined threshold set at the OEM design level may produce a high jamming event probability. A received signal having a pulse width or quiet phase duration outside of the predetermined threshold set at the OEM design level may produce a moderate jamming event probability. A received signal having a pulse width or quiet phase duration outside of the predetermined threshold set at the OEM design level in addition to a receive signal having a stronger RSSI than expected, or a longer overall signal duration, or combination thereof, may produce a high jamming event probability. The algorithm of FIG. 3 may be performed repeatedly and interchangeably and at the same time depending requirements of the processor or controller.

Figure 4:
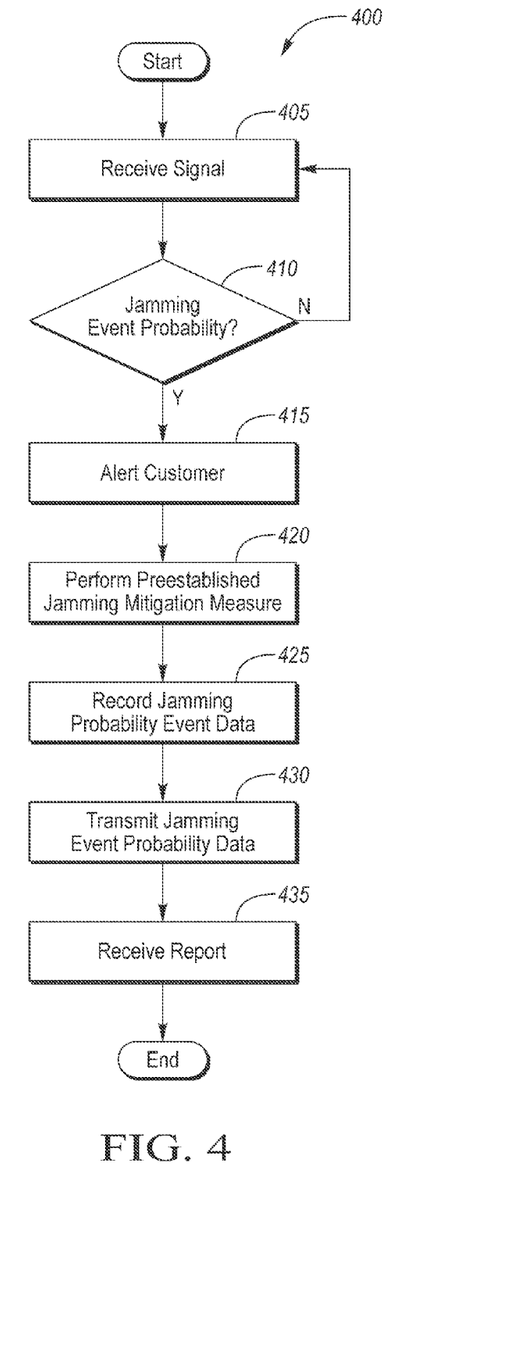
FIG. 4 is an exemplary process for detecting, mitigating, and reporting a jamming event probability.

FIG. 4 is an exemplary process 400 for detecting, mitigating, and reporting a jamming event probability. The process begins at block 405, in which the controller 110 receives a signal having signal properties from at least one receiver 115. As mentioned previously, the signal properties may include signal strength, duration, message structure, protocol format, and transmitter ID. Once the controller 110 receives the signal, the process 400 proceeds to block 410.

At block 410, the controller 110 may determine a jamming event probability associated with a received signal. In some exemplary approaches, the controller 110 may initially determine the pulse width and quiet phase duration of the received signal. The controller 110 may then compare the received signal properties with a predetermined threshold associated with each signal property as specified above.

At block 415, controller 110 may provide real-time alert messages in response to the jamming event probability being one of moderate or high. The alert response may be pre-defined by the vehicle 105 OEM and/or specifically customized to the vehicle user's preference via a configuration set-up method maintained in the database 125. For example, the alert response may involve a vehicle 105 based indicator in which the door light-emitting diode (LED) lights flash or the horn begins to chirp. An alert response may be sent to a paired phone or mobile connectivity device (e.g., a tablet computer) via Bluetooth® wireless connection, SMS Message, WiFi, or Email. Likewise, the controller 110 may communicate with a human-machine interface (HMI) to display an alert message warning the vehicle 105 occupants of the risk of potential RF Jamming and providing a recommended course of action, such as locking the doors by interior switch. Furthermore, an alert may be transmitted to the vehicle 105 key fob and displayed in the form of a blinking LED or via text on the key fob display. An alert may be transmitted over a dedicated short-range communications (DSRC) vehicle-to-vehicle or vehicle-to-infrastructure connection along with location, signal properties, and the date and time of occurrence as a courtesy to other vehicles and authorities. Further, as part of a customer preference set-up for jamming detection, the customer may elect to allow the vehicle controller 110 to arm the security alarm whenever a door ajar event is detected within a specified time frame around an RF jamming event detection if the vehicle is not locked within a specified period of the event (eg. 3-5 seconds). If the jamming proved successful in blocking the lock transmission, this arming method may still allow some protection by sounding the alarm when the unlocked door is opened.

At block 420, the controller 110 may operate the vehicle according to a security mode maintained in the database 125. For example, if a jamming event probability is detected along with signs of driver departure (e.g., engine shut-off, door ajar, no PEPs key fob detected within the cabin) and a door lock event was not detected, the vehicle could perform an automatic lock event. Detection of departure may trigger the vehicle 105 security alarm system to arm so that it would trigger in the case of a door ajar event and/or triggering motion or inclination (e.g., tilt) sensors. Further, the security alarm system may trigger in the event the tires are detected to be moving (e.g., via TPMS or anti-lock brake sensor transmission) while the engine is off, for example to detect illegal towing of the unlocked vehicle.

At block 425, the controller 110 may record jamming event probability level data in the database 125. For example, the jamming event probability level data may include the date and time of detecting the potential RF jamming signal and the received signal strength or RSSI value from the receiver 115. Recording the RSSI with OEM and vehicle model year may help build a national database with normalized measurements from different OEMs. Additionally or alternatively, the jamming event probability level data may include GPS location and elevation, vehicle heading (e.g., course), the alert response and mitigation measure triggered, and the method used to notify the customer. Once the controller 110 has recorded the jamming event probability (via the database 125), the process 400 may proceed to block 430.

At block 430, the controller 110, via the communications device (not shown), may transmit the jamming event probability to the remote server 130. The remote server 130 may maintain jamming event probability level data received by all vehicles 105 in communication with the server 130 via a remote database 140, for example a cloud-based database. Creating a composite remote database 140 of jamming event probability level data may indicate regional hot spots in which RF jamming signals are frequently reported. For example, abundant indications of probable jamming events received in a particular location may create a regional hot spot or region. Such information may be of interest to authorities in order to correct the situation, as well as OEMs with respect to investigating field concerns and vehicle warranties. Additionally or alternatively, at block 435 the computing device 135 may analyze the jamming event probability level data and send a report to the vehicle 105, for example, via Email, text message, or display on the vehicle's HMI display.

Computing devices, such as the vehicle control modules, sensors, interfaces, etc., generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer-readable media associated therewith (e.g., disks, memories, etc.). A computer program product may comprise such instructions stored on computer-readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, the use of the words "first," "second," etc. may be interchangeable.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A jamming detection system for a vehicle, comprising:
   an antenna configured to receive a radio frequency (RF) wave defining a series of RF pulse and quiet phase durations; and
   a processor programmed to lock the vehicle in response to one but not both of the durations exceeding a predetermined threshold, and to arm an alarm of the vehicle in response to both of the durations exceeding respective predetermined thresholds.

2. The system of claim 1, wherein the predetermined thresholds are respectively proportional to the pulse duration and quiet phase duration.

3. The system of claim 1, wherein the processor is further programmed to adjust at least one of the predetermined thresholds in response to a location of the vehicle falling within a predetermined region.

4. The system of claim 3, wherein adjusting at least one of the predetermined thresholds includes reducing at least one of the predetermined thresholds in response to the predetermined region having a jamming occurrence level exceeding a threshold value.

5. A method comprising:
   receiving a signal including a radio frequency (RF) wave defining alternating pulse and quiet phase durations; and
   by a controller,
     operating a vehicle in a first security mode in response to one but not both of the durations exceeding a predetermined threshold, and
     operating the vehicle in a second security mode in response to both of the durations exceeding respective predetermined thresholds.

6. The method of claim 5, wherein one of the security modes is a locking mode.

7. The method of claim 5, wherein one of the security modes is an alarm arming mode.

8. The method of claim 5 further comprising adjusting the predetermined thresholds respectively in proportion to the pulse duration and quiet phase duration.

9. The method of claim 5 further comprising adjusting at least one of the predetermined thresholds in response to a location of the vehicle falling within a predetermined region.

10. The method of claim 9, wherein the adjusting includes reducing at least one of the predetermined thresholds in response to the predetermined region having a jamming occurrence level exceeding a threshold value.

11. A jamming detection system for a vehicle, comprising:
    an antenna configured to receive a radio frequency (RF) wave having a duty cycle and a cycle time; and
    a processor programmed to operate the vehicle in a first security mode in response to the duty cycle or cycle time exceeding a predetermined threshold, and to operate the vehicle in a second security mode in response to the duty cycle and the cycle time exceeding respective predetermined thresholds.

12. The system of claim 11, wherein one of the security modes is a locking mode.

13. The system of claim 11, wherein one of the security modes is an alarm arming mode.

14. The system of claim 11, wherein the predetermined thresholds are respectively proportional to the duty cycle and cycle time.

15. The system of claim 11, wherein the processor is further programmed to adjust at least one of the predetermined thresholds in response to a location of the vehicle falling within a predetermined region.

16. The system of claim 15, wherein adjusting at least one of the predetermined thresholds includes reducing at least one of the predetermined thresholds in response to the predetermined region having a jamming occurrence level exceeding a threshold value.

\* \* \* \* \*